United States Patent
Ho et al.

(10) Patent No.: US 7,990,463 B2
(45) Date of Patent: Aug. 2, 2011

(54) MULTI-STAGE LENS DRIVING DEVICE

(75) Inventors: Wen Jen Ho, Hsinchu County (TW); Chi Lone Chang, Hsinchu County (TW); Wen Tsai Hsu, Hsinchu County (TW)

(73) Assignee: Power Gate Optical Inc

( * ) Notice: Subject to any disclaimer, the term of this patent is extended or adjusted under 35 U.S.C. 154(b) by 729 days.

(21) Appl. No.: 12/012,875

(22) Filed: Feb. 5, 2008

(65) Prior Publication Data

US 2009/0196150 A1 Aug. 6, 2009

(51) Int. Cl.
G03B 13/00 (2006.01)
H04N 5/232 (2006.01)
H04N 5/225 (2006.01)

(52) U.S. Cl. .................................. 348/357; 348/374
(58) Field of Classification Search .................. 348/357
See application file for complete search history.

(56) References Cited

U.S. PATENT DOCUMENTS

| | | | | |
|---|---|---|---|---|
| 4,605,286 A * | 8/1986 | Sumi | | 359/696 |
| 4,639,084 A * | 1/1987 | Kugioka | | 359/824 |
| 4,828,360 A * | 5/1989 | Maruyama | | 359/824 |
| 6,424,472 B1 * | 7/2002 | Chen | | 359/819 |
| 6,704,505 B1 * | 3/2004 | Hung | | 396/85 |
| 7,061,700 B2 * | 6/2006 | Honsho | | 359/824 |
| 7,145,738 B2 * | 12/2006 | Shu et al. | | 359/824 |
| 7,146,097 B2 * | 12/2006 | Kameyama | | 396/133 |
| 7,206,145 B2 * | 4/2007 | Otaka et al. | | 359/824 |
| 7,221,526 B2 * | 5/2007 | Manabe | | 359/824 |
| 7,359,631 B2 * | 4/2008 | Naka et al. | | 396/79 |
| 7,505,219 B2 * | 3/2009 | Ho et al. | | 359/824 |
| 7,570,880 B2 * | 8/2009 | Yoon et al. | | 396/133 |
| 7,630,151 B2 * | 12/2009 | Fujita et al. | | 359/822 |
| 7,787,044 B2 * | 8/2010 | Chang | | 348/357 |
| 2006/0061891 A1 * | 3/2006 | Ito et al. | | 359/824 |
| 2006/0132937 A1 * | 6/2006 | Choi et al. | | 359/824 |
| 2008/0080072 A1 * | 4/2008 | Chang | | 359/823 |

* cited by examiner

Primary Examiner — Sinh Tran
Assistant Examiner — Jason A Flohre (57) ABSTRACT

A multi-stage lens driving device for driving an optical lens so as to perform the functions of zooming and/or focusing comprises: a front cover, a rear cover, a plurality of yokes, a plurality of driving coils, a lens seat, and a plurality of permanent magnets. The front cover is a hollow annular cover having a plurality of recesses formed on an inner periphery thereof and a plurality of holders on an outer periphery thereof. The rear cover can be combined with the front cover, thereby forming a receiving space therebetween. The lens seat is a hollow housing disposed in the receiving space. The yokes are provided in the recesses formed on the inner periphery of the front cover. The permanent magnets are surrounding and embedded in an outer periphery of the lens seat, disposed in correspondence to the yokes and spaced therefrom by a predetermined distance. The driving coils are provided respectively on the holders of the front cover, and correspond respectively to the yokes received in the recesses. When predetermined impulse currents of different directions are applied to the driving coils respectively, polarities of corresponding yokes are reversed, respectively. By virtue of magnetic attraction between the permanent magnets and the yokes, rotation of the lens seat in the receiving space is converted to linear axial translation.

19 Claims, 10 Drawing Sheets

Cross-sectional view along line A-A

| Driving coil | 14a | 14b | 14c | 14d |
|---|---|---|---|---|
| Yoke | 13a | 13b | 13c | 13d |
| Stage | Magnetic polarity | | | |
| 1st stage | — | — | — | — |
| 2nd stage | N | S | S | N |
| 3rd stage | N | N | S | S |
| 4th stage | S | N | N | S |
| 5th stage | S | S | N | N |
| 6th stage | N | S | S | N |

MULTI-STAGE LENS DRIVING DEVICE

BACKGROUND OF INVENTION

1. Field of the Invention

The present invention relates to a multi-stage lens driving device and, more particularly, to an optical lens driving device operated on electromagnetic fields for multi-stage focusing and/or zooming.

2. Description of the Prior Art

Figure 1:
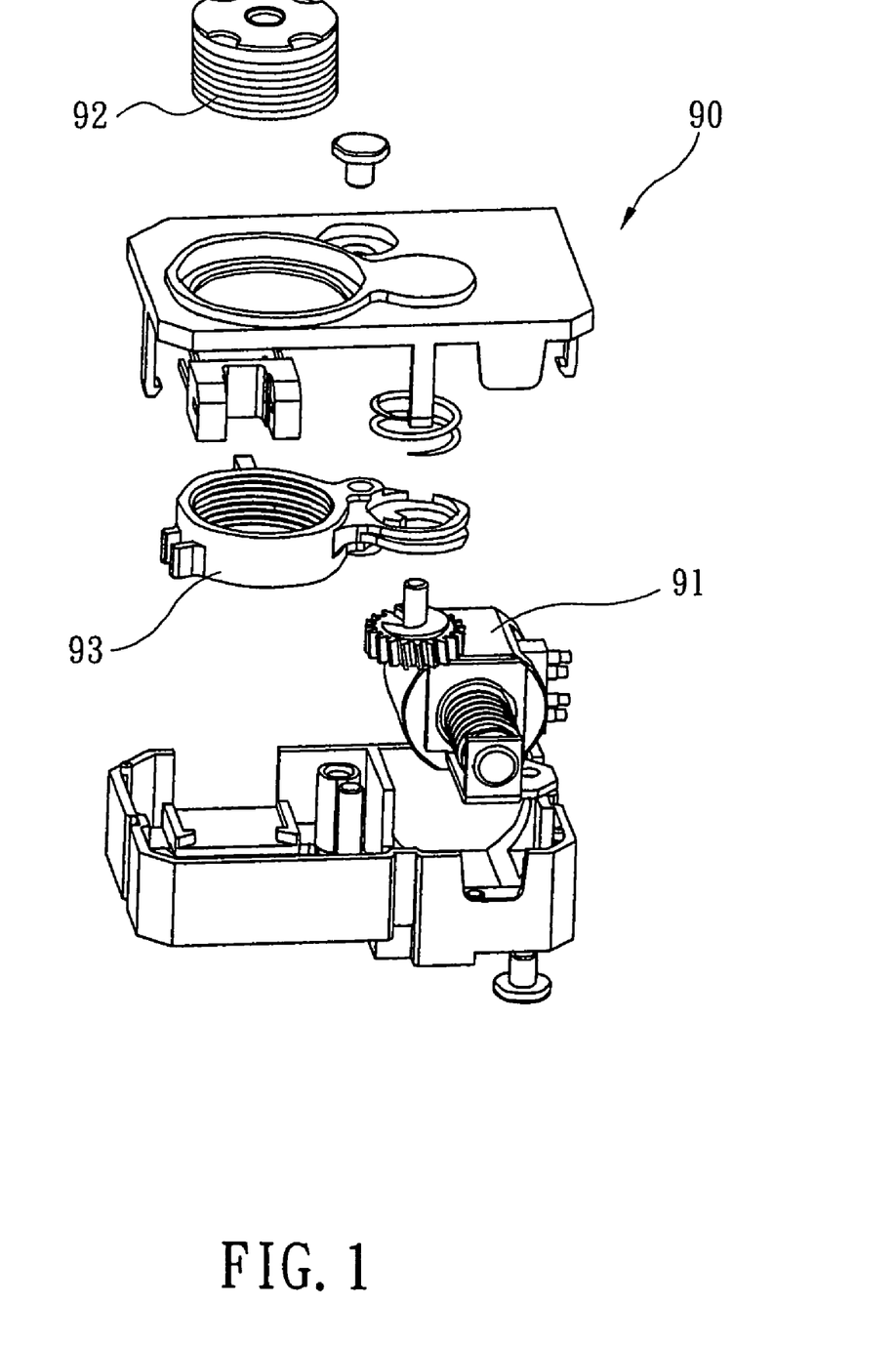
FIG. 1 is a schematic, perspective exploded view of a conventional zoom lens.

Refer to FIG. 1, which shows a mechanical-transmission focusing device 90 as used in a conventional photographing apparatus. The focusing device 90 uses a high-cost precision driving element 91 (e.g., a step motor, ultra-sound motor, piezoelectric actuator, etc.) as a power source for driving a seat 93 holding a lens set 92, and includes a large number of transmission elements. Such design not only results in a complicated mechanical configuration, but also requires a complex assembly process with numerous steps, leads to a bulky size and high cost, and poses such serious problems as high power consumption.

Photography in the old days was an elaborate technique depending on manual light measuring, focusing by hand, and self-assisted film winding. However, where heavy manual operation is required, errors tend to ensue. Therefore, in this period of time, the qualification of a photographer was essential, especially on important shooting occasions that would not take place again. With the substantial development of machine automation in the 1950s and 1960s, more and more people had come to believe that automation would be a guide to the future world. Then the development of the automatic light-metering techniques and power film winders have sufficiently revealed the prospects of the photography towards automation; and an "automatic focusing system", which is the most critical part in photography automation and an important factor dominating the shooting speed, has become a highlighted item for many camera manufactures to research and develop.

With rapid advancement of technology, traditional professional photographing apparatuses not only have improved in terms of image quality, but also are made lighter, thinner and smaller to be lined with the modem products of this diversified information era. Therefore, a focusing and/or zooming lens mechanically driven by a step motor has become disadvantageous because its size cannot be further reduced, thereby preventing the final assembled products from being smaller and lighter. On the other hand, manufactures have turned to electromagnetic technologies and used VCM electronic feedback systems to monitor the deviation of coils in order to replace conventional step motors and further downsize the driving structures. Meanwhile, there is a trendy to integrate products with various functions. For example, the photographing function may be integrated into mobile phones, personal digital assistants (PDAs) or notebook computers, so as to provide more powerful video functions. Therefore, regarding to manufactures' designing a product having different functions that share a single power supply, it is a major research and development issue to reduce the size, the cost and power consumption, so that the product is endowed with increased standby time and operation time while using power supplies of the same capacity.

SUMMARY OF INVENTION

The first objective of the present invention is to provide a multi-stage lens driving device which has a more compact size, a simpler structure and a lower power consumption as compared with the above-mentioned conventional technologies.

The second objective of the present invention is to provide a multi-stage lens driving device in which driving coils are wound on holders of a front cover, and when impulse currents are applied to the driving coils, a magnetic action between yokes installed on an inner periphery of the front cover and permanent magnets results in relative movement of the yokes and the permanent magnets by virtue of the principle of electromagnetic induction, so that rotation of a lens seat is converted into linear axial translation. Thus, installation of a conventional step motor becomes unnecessary; the number of elements and the size of the device are further reduced; and the structure is made simple.

The third objective of the present invention is to provide a multi-stage lens driving device which uses an attraction between yokes installed in an inner periphery of a front cover and permanent magnets attached to a lens seat, so that when impulse currents to driving coils are cut off, the lens seat is securely attracted to yokes corresponding to particular locations by virtue of the permanent magnets, thereby significantly reducing power consumption to reach the goal of power saving.

The fourth objective of the present invention is to provide a multi-stage lens driving device in which a lens seat can be equipped with an optical lens, and a finer adjustment in focusing and/or zooming with more stages can be achieved through attraction and repulsion between yokes whose polarities are reversed and permanent magnets installed on the lens seat, so that a clearer image is obtained.

In order to achieve the above-mentioned objectives, a multi-stage lens driving device of the present invention which defines a central axis comprises: a front cover, a rear cover, a plurality of yokes, a plurality of driving coils, a lens seat, and a plurality of permanent magnets. The front cover is a hollow annular cover having a plurality of recesses formed on an inner periphery thereof and a plurality of holders on an outer periphery thereof. The rear cover can be combined with the front cover, thereby forming a receiving space therebetween. The lens seat is a hollow housing disposed in the receiving space.

The yokes are provided respectively in the recesses formed on the inner periphery of the front cover. The permanent magnets are surrounding and embedded in an outer periphery of the lens seat, disposed in correspondence to the yokes and spaced therefrom by a predetermined distance. The driving coils are provided respectively on the holders of the front cover, and correspond respectively to the yokes received in the recesses.

When predetermined impulse currents of different directions are applied to the driving coils respectively and the impulse current directions in the respective driving coils are sequentially changed in a rotational order with respect to the central axis, the yokes corresponding to the respective driving coils reverse polarities alternately. The alternate magnetic attraction and repulsion between the permanent magnets embedded in the lens seat and the yokes result in rotational translation of the lens seat in the receiving space due to alternate polarity reversal of the yokes, wherein the plurality of permanent magnets provide for multiple focusing stages.

When no impulse current is applied to the driving coils, the lens seat is held to a predetermined location by attraction between the permanent magnets and the yokes, so that the lens seat will not wobble, thereby achieving the goal of power saving.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 2:
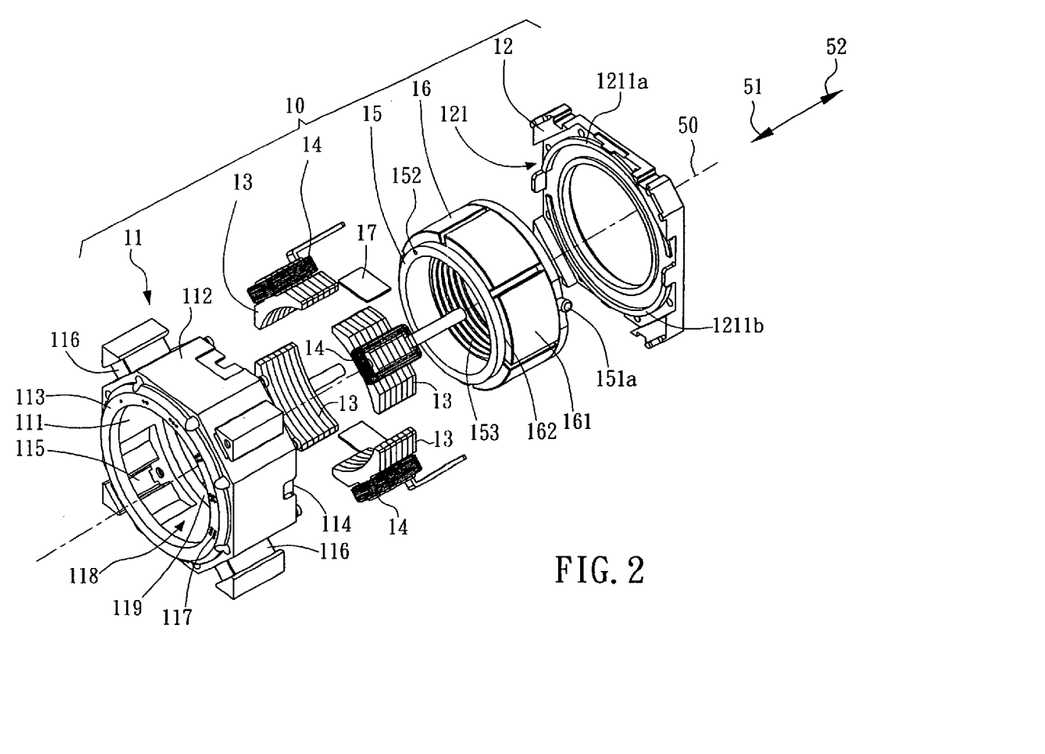
FIG. 2 is a perspective exploded view of a multi-stage lens driving device according to the present invention from a first viewing angle.
Figure 3:
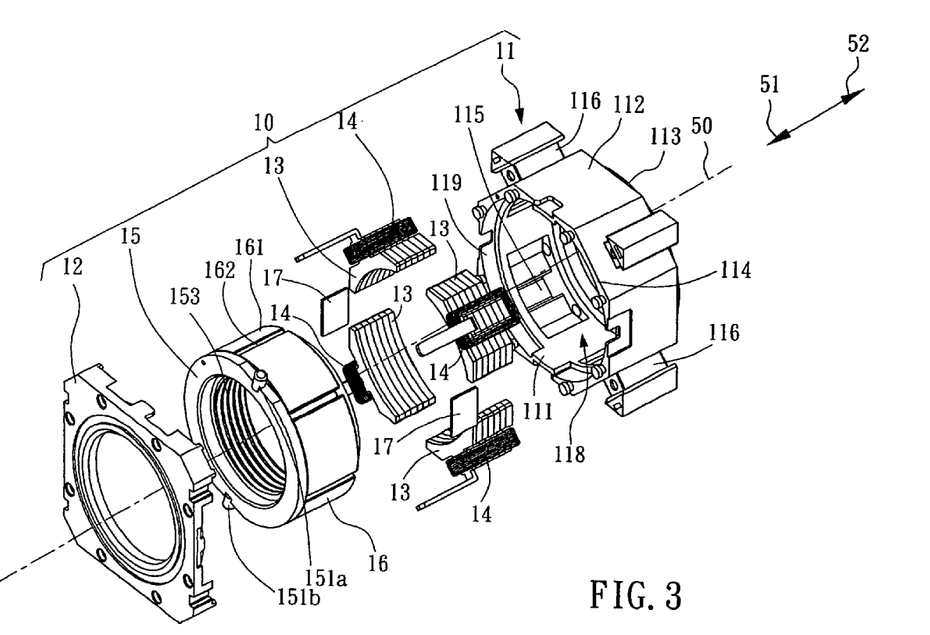
FIG. 3 is a perspective exploded view of the multi-stage lens driving device according to the present invention from another viewing angle.

Now refer to FIGS. 2 and 3. FIG. 2 is a perspective exploded view of a multi-stage lens driving device according to the present invention from a first viewing angle while FIG. 3 is a perspective exploded view of the multi-stage lens driving device according to the present invention from another viewing angle. As shown in FIG. 2, a multi-stage lens driving device 10 which defines a central axis 50 comprises: a front cover 11, a rear cover 12, a plurality of yokes 13, a plurality of driving coils 14, a lens seat 15, and a plurality of permanent magnets 16. The central axis 50 includes two axial directions: a front direction 51 and a rear direction 52.

The front cover 11 and the rear cover 12 substantially form a hollow housing structure having a receiving space therein. The front cover 11 is a hollow annular cover comprising: an inner periphery 111, an outer periphery 112, a front surface 113, and a bottom surface 114. A plurality of recesses 115 are evenly provided on the inner periphery 111 of the front cover 11 for receiving the yokes 13 therein, respectively. A plurality of holders 116 are evenly provided at predetermined locations on the outer periphery 112. The holders 116 are in two pairs and evenly located on the outer periphery 112 in positional correspondence to the recesses 115 where the yokes 13 are received, wherein holders of a same pair are located at opposite positions on the outer periphery 112. The driving coils 14 are wound on the holders 116 respectively, for receiving impulse currents of predetermined directions and thereby reversing the polarities (N or S) of the yokes 13, respectively.

A plurality of stage markers 117 are pre-formed on the front surface 113 of the front cover 11 for distinguishing the zooming or focusing stage presently in use. A bottom surface 114 allows the rear cover 12 to be connected therewith. The rear cover 12 can be properly positioned and combined with the bottom surface 114 of the front cover 11 with the help of an insert 17, so that a receiving space 118 is formed inside the front cover 11 and the rear cover 12 for receiving therein the lens seat 15 and the permanent magnets 16.

The rear cover 12 is provided with an annular rail 121 which cooperates with a sliding groove 119 pre-formed on the inner periphery of the front cover 11, so that two sliding blocks 151a and 151b (as shown in FIG. 3) arranged on a rear side of the lens seat 15 are disposed and can slide on two annular ramps 1211a and 1211b of the annular rail 121, respectively. The ramps 1211a and 1211b allow the lens seat 15 to convert its motion from rotating around the central axis 50 to a linear back-and-forth axial translation along the same axis. Therefore, the annular rail 121 on the rear cover 12, the two annular ramps 1211a and 1211b, and the two sliding blocks 151a and 151b arranged on the rear side of the lens seat 15 substantially constitute a guide mechanism for converting rotational motion of the lens seat 15 into a linear translation along the central axis.

The two ramps 1211a and 1211b on the rear cover 12 (as shown in FIG. 2) each have a high slope and a low slope. The high slope and the low slope of the ramp 1211a are connected with the low slope and the high slope of the ramp 1211b respectively, so as to form an annular and wavy shape. As such, when the two sliding blocks 151a and 151b arranged on the rear side of the lens seat 15 slide simultaneously on the two ramps 1211a and 1211b, the two sliding blocks 151a and 151b are moving rotationally from the low slopes of the two ramps 1211a and 1211b to the high slopes thereof, respectively; or from the high slopes to the low slopes, respectively. Therefore, as the lens seat 15 rotates, the lens seat 15 is also moving linearly inside the receiving space 118 along the sliding groove 119 in the front direction 51 or rear direction 52 of the central axis 50. The magnetic action between the permanent magnets 16 and the yokes 13 generates a multi-stage motion.

Each of the permanent magnets 16 comprises an upper surface 161 and a lower surface 162, each of which surfaces having a different polarity (N or S). The permanent magnets 16 are evenly distributed on and fixedly embedded in the outer periphery of the lens seat 15, and alternately arranged thereon with respect to the different polarities (N or S) of the lower surfaces 162, so that the upper surfaces 161 are also alternately arranged with respect to the different polarities (N or S) thereof. The upper surface 161 of each permanent magnet 16 is spaced from a respective yoke 13 by a predetermined distance. A magnetic attraction or repulsion occurs between the upper surface 161 having a preset polarity (N or S) and the corresponding yoke 13, thereby indirectly driving the lens seat 15 to rotate in the receiving space 118.

Figure 4:
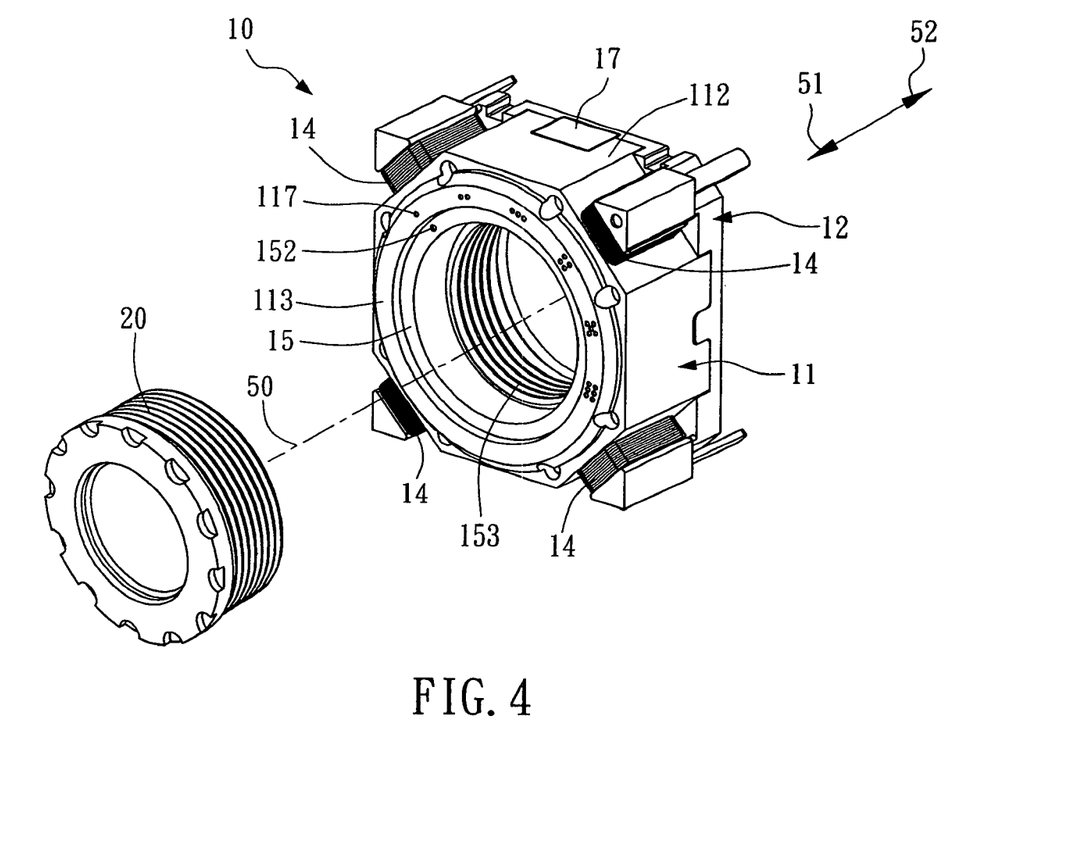
FIG. 4 is a perspective assembly drawing of the multi-stage lens driving device according to the present invention.

Please refer to FIG. 4 in conjunction with FIGS. 2 and 3. FIG. 4 is a perspective assembly drawing of the multi-stage lens driving device according to the present invention. As shown in FIG. 4, the front cover 11 and the rear cover 12 can be properly positioned and combined together with the help of the insert 17, with the lens seat 15 disposed in the receiving space 118. The lens seat 15 is a hollow housing and has a thread 153 on a wall of a central hole thereof. An optical lens 20 can be fixedly connected with the thread 153 and move simultaneously with the lens seat 15 so as to achieve multi-stage zooming or focusing.

A reference marker 152 is pre-formed on the lens seat 15 for cooperating with the stage markers 117 formed on the front surface 113 of the front cover 11 to indicate the stage at which the lens seat 15 presently is. In this embodiment, the stage markers 117 generally include six stages as marked on the front surface 113 of the front cover 11, corresponding to the stages that the yokes 13 have moved the permanent magnets 16 to. The stage markers 117 also indicate the zooming or focusing stage of the optical lens 20 inside the receiving space 118, for reference by a user trying to adjust focal length.

Figure 5A:
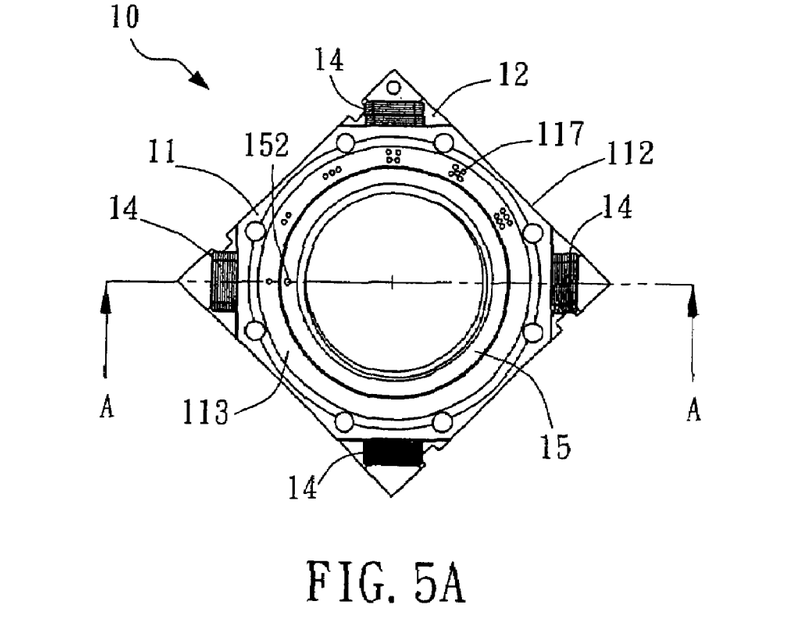
FIG. 5A is a top view of the multi-stage lens driving device according to the present invention.
Figure 5B:
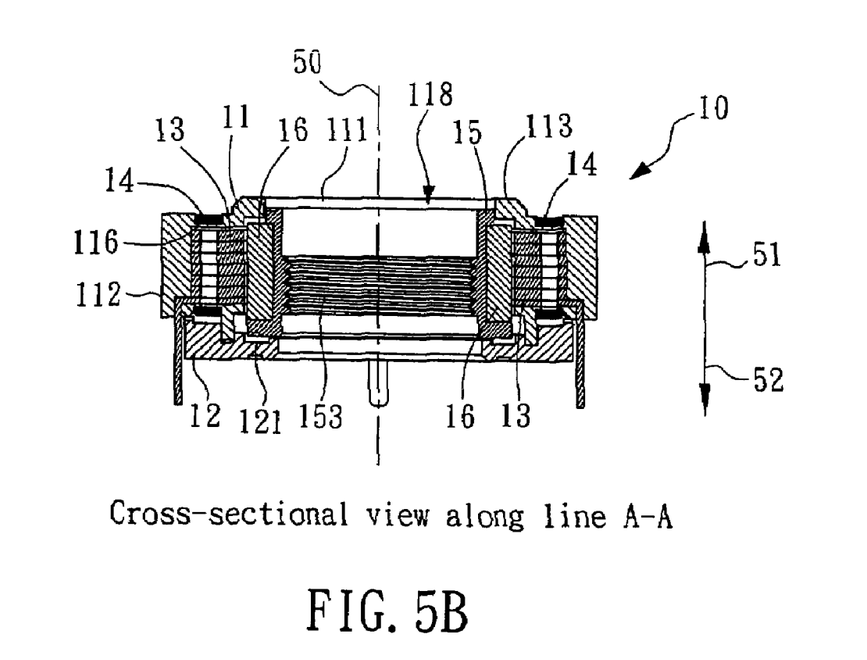
FIG. 5B is a cross-sectional view of the multi-stage lens driving device according to the present invention taken along a line A-A.

Referring to FIGS. 5A and 5B, therein, FIG. 5A is a top view of the multi-stage lens driving device according to the present invention and FIG. 5B is a cross-sectional view of the multi-stage lens driving device according to the present invention along line A-A. As shown in FIG. 5A, in the multi-stage lens driving device 10 of the present invention, the holders 116 on the front cover 11 are in two pairs and evenly arranged on the front cover 11, wherein holders of a same pair are located at opposite positions on the outer periphery 112. Each of the holders 116 is wound with a driving coil 14. The lens seat 15 is situated in the receiving space 118 formed between the front cover 11 and the rear cover 12, with the pre-formed reference marker 152 in alignment with one of the plurality of stage markers 117 formed on the front surface 113 of the front cover 11, so that the stage marker for a first stage (initial position) serves as a reference point.

As shown in FIG. 5B, the recesses 115 are formed on the inner periphery 111 of the front cover 11 in positional correspondence to the respective holders 116 on the outer periphery 112, for receiving the yokes 13 therein, respectively. Therefore, the driving coils 14 with input impulse currents of different directions can alternately reverse the polarities of the respective yokes 13 through the holders 116, thereby driving the respective permanent magnets 16 embedded in the lens seat 15, so that the lens seat 15 moves linearly back and forth inside the receiving space 118 along the central axis 50.

Figure 6:
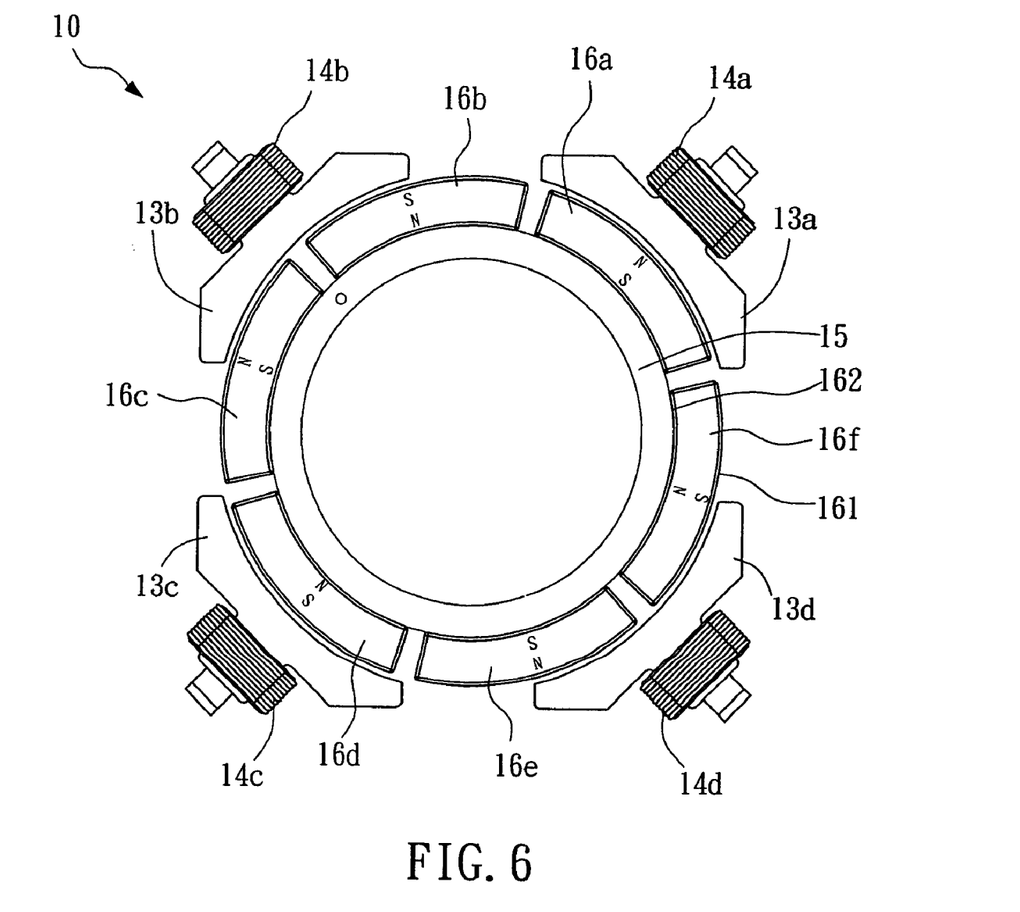
FIG. 6 illustrates the relative position of the driving coils, the yokes and the permanent magnets of the present invention.

Referring to FIG. 6, wherein relative position of the driving coils, the yokes and the permanent magnets of the present invention is shown. In the present invention, the plurality of driving coils 14a, 14b, 14c, and 14d and the plurality of permanent magnets 16a, 16b, 16c, 16d, 16e and 16f substantially constitute an electromagnetic driving mechanism while the yokes 13a, 13b, 13c and 13d serve to guide the direction of magnetic force. One of the driving coils and the permanent magnets is combined with and annularly distributed on the periphery of the lens seat, and the other of the driving coils and the permanent magnets is combined with and annularly distributed on the housing, so that the lens seat can move rotationally relative to the housing when predetermined impulse currents are applied to the driving coils. In this embodiment, the multi-stage lens driving device 10 comprises four driving coils 14a, 14b, 14c and 14d, which correspond to four yokes 13a, 13b, 13c and 13d respectively, and have electromagnetic induction with the permanent magnets 16. There are six permanent magnets 16 in this embodiment, which are permanent magnets 16a, 16b, 16c, 16d, 16e and 16f. These permanent magnets are annularly and evenly distributed on and embedded in the periphery of the lens seat 15.

With alternate reversal of directions of the input impulse currents in the respective driving coils 14a, 14b, 14c and 14d, a repulsion of the same polarity (N or S) or an attraction of opposite polarities occurs between the permanent magnets 16a, 16b, 16c, 16d, 16e and 16f and the yokes 13a, 13b, 13c and 13d, driving the lens seat 15 to translate back and forth in the receiving space 118 along the central axis 50. A six-stage back-and-forth linear translation of the lens seat 15 is thus achieved. When no impulse current is applied to the driving coils 14a, 14b, 14c and 14d, attraction between the permanent magnets 16a, 16b, 16c, 16d, 16e and 16f and the yokes 13a, 13b, 13c and 13d holds the lens seat 15 at a predetermined location so that the lens seat 15 does not tend to wobble.

Similarly, when the lens seat 15 is moved to another stage and translation to said stage is complete, currents to the driving coils 14a, 14b, 14c and 14d can be cut off, so that the permanent magnets 16a, 16b, 16c, 16d, 16e and 16f and the yokes 13a, 13b, 13c and 13d are attracted to each other by virtue of a magnetic force therebetween, thereby saving power.

Figure 7:
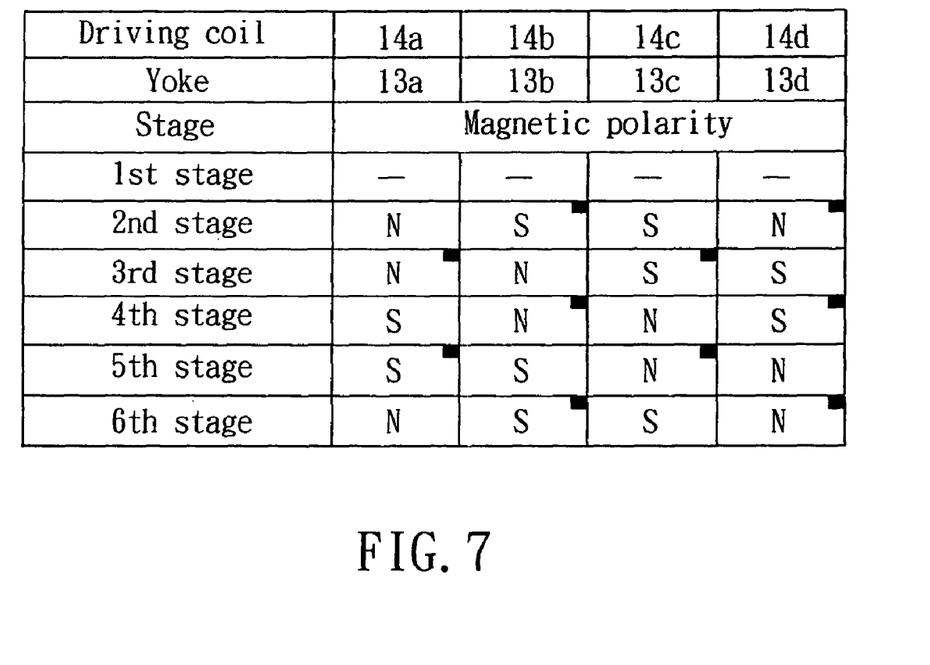
FIG. 7 is a reference chart showing polarity reversals of the respective yokes of the multi-stage lens driving device according to the present invention.

Now refer to FIG. 7 in conjunction with FIG. 6. FIG. 7 is a reference chart showing polarity reversals of the respective yokes of the multi-stage lens driving device according to the present invention. As tabulated in FIG. 7, the multi-stage lens driving device 10 of the present invention allows for the lens seat 15 to translate linearly inside the receiving space 118 from a first stage to a sixth stage, consecutively, wherein impulse currents inputted into the respective driving coils 14a, 14b, 14c and 14d change directions sequentially, generally in a counter-clockwise direction around the central axis 50, so that the corresponding yokes 13a, 13b, 13c and 13d alternately reverse polarities thereof (as tabulated in FIG. 7), thereby actuating a magnetic attraction or repulsion by the permanent magnets 16a, 16b, 16c, 16d, 16e and 16f embedded in the lens seat 15. The lens seat 15 is thus driven to move along the central axis 50 in the front direction 51 from the first stage (initial position) to the next stage, or consecutively to the sixth stage.

In other words, when the lens seat 15 is required to move from the sixth stage back to a previous stage or the first stage (initial position) in the rear direction 52 of the central axis 50, a user only has to reverse the above operation by changing the directions of impulse currents applied to the respective driving coils 14a, 14b, 14c and 14d in a reverse order to that used to move the lens seat 15 from the first stage to the sixth stage; that is to say, by changing the impulse current directions of the respective driving coils 14a, 14b, 14c and 14d sequentially in a clockwise direction around the central axis 50, so that the corresponding yokes 13a, 13b, 13c and 13d alternately reverse polarities thereof. Again, a magnetic attraction or repulsion between the yokes 13a, 13b, 13c and 13d and the respective permanent magnets 16a, 16b, 16c, 16d, 16e and 16f drives the lens seat 15 to move consecutively from the sixth stage back to a previous stage or to the first stage (initial position).

Refer to FIGS. 8A to 8F in conjunction with FIG. 7. FIGS. 8A to 8F are schematic drawings showing the operation in each stage of the multi-stage lens driving device according to the present invention. In FIGS. 8A to 8F, when impulse currents of different directions are applied to the respective driving coils 14a, 14b, 14c and 14d, the corresponding yokes 13a, 13b, 13c and 13d reverse polarities thereof (N or S) generally in a counter-clockwise direction around the central axis 50. This counter-clockwise direction is opposite to the clockwise direction in which the lens seat 15 rotates. In addition, the polarities (N or S) of the respective permanent magnets 16a, 16b, 16c, 16d, 16e and 16f embedded in the outer periphery of the lens seat 15 refer to polarities of the upper surfaces 161 facing the yokes 13.

Figure 8A:
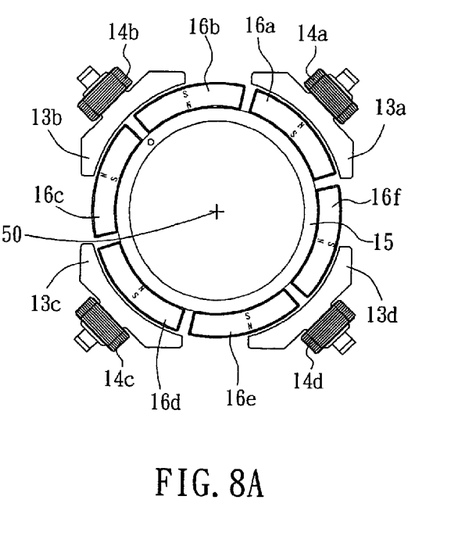
FIGS. 8A to 8F are schematic drawings showing the operation in each stage of the multi-stage lens driving device according to the present invention.

As shown in FIG. 8A, the lens seat 15 is at the first stage (i.e., the initial position) and held to the yokes 13a, 13b, 13c and 13d by attraction of the permanent magnets 16a, 16b, 16c, 16d, 16e and 16f embedded in the lens seat 15, so that when no impulse current is applied to the driving coils 14a, 14b, 14c and 14d, the lens seat 15 is securely fixed at the first stage and does not tend to wobble.

Figure 8B:
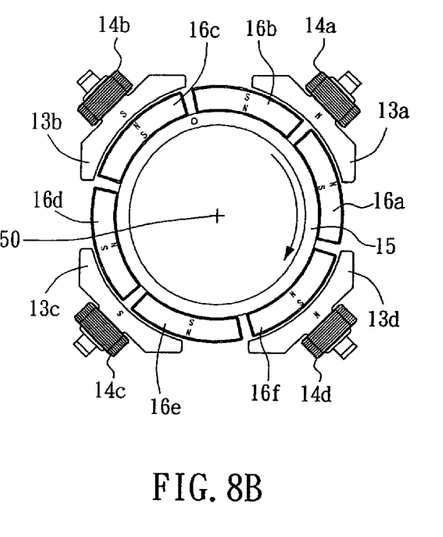

As shown in FIG. 8B, the lens seat 15 is moving from the first stage to a second stage (please refer to FIG. 7 for polarities of the yokes 13a, 13b, 13c and 13d corresponding to the second stage). When impulse currents of predetermined directions are applied to the respective driving coils 14a, 14b, 14c and 14d, the yoke 13a (N) and the yoke 13c (S) repel the permanent magnet 16a (N) and the permanent magnet 16d (S)

respectively (i.e., repulsion of the same polarity) in a clockwise direction around the central axis 50. Meanwhile, the yoke 13b (S) and the yoke 13d (N) attract the permanent magnet 16c (N) and the permanent magnet 16f (S) respectively (i.e., attraction between opposite polarities), so that the lens seat 15 moves along the central axis 50 in the front direction 51 towards the second stage.

Figure 8C:
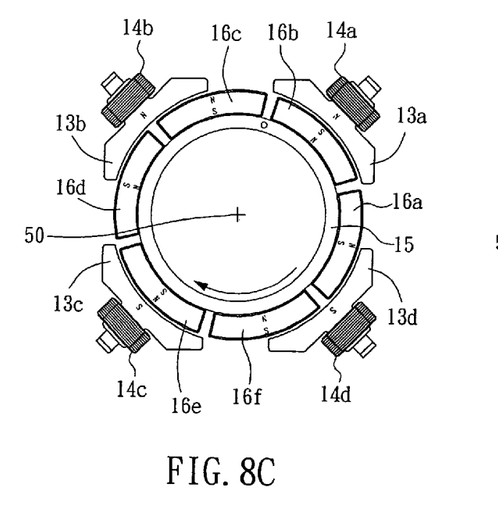

As shown in FIG. 8C, the lens seat 15 is moving from the second stage to a third stage (please refer to FIG. 7 for polarities of the yokes 13a, 13b, 13c and 13d corresponding to the third stage). When impulse currents whose directions are opposite to those for the second stage are applied to the respective driving coils 14a, 14b, 14c and 14d, the yoke 13b (N) and the yoke 13d (S) repel the permanent magnet 16c (N) and the permanent magnet 16f (S) respectively (i.e., repulsion of the same polarity) in a clockwise direction around the central axis 50. Meanwhile, the yoke 13a (N) and the yoke 13c (S) attract the permanent magnet 16b (S) and the permanent magnet 16e (N) respectively (i.e., attraction between opposite polarities), so that the lens seat 15 moves along the central axis 50 in the front direction 51 towards the third stage.

Figure 8D:
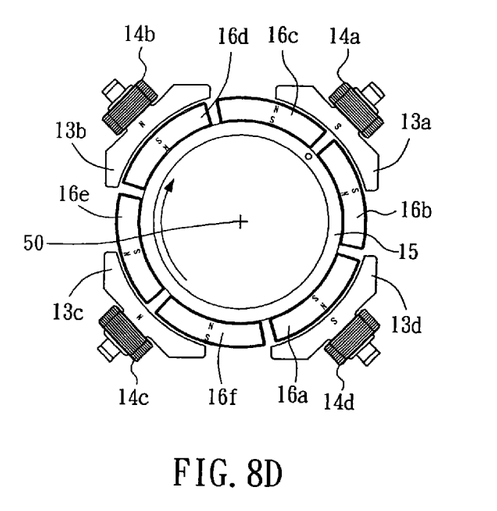

As shown in FIG. 8D, the lens seat 15 is moving from the third stage to a fourth stage (please refer to FIG. 7 for polarities of the yokes 13a, 13b, 13c and 13d corresponding to the fourth stage). When impulse currents whose directions are opposite to those for the third stage are applied to the respective driving coils 14a and 14c, the yoke 13a (S) and the yoke 13c (N) repel the permanent magnet 16b (S) and the permanent magnet 16e (N) respectively (i.e., repulsion of the same polarity) in a clockwise direction around the central axis 50. Meanwhile, the yoke 13b (N) and the yoke 13d (S) attract the permanent magnet 16d (S) and the permanent magnet 16a (N) respectively (i.e., attraction between opposite polarities), so that the lens seat 15 moves along the central axis 50 in the front direction 51 towards the fourth stage.

Figure 8E:
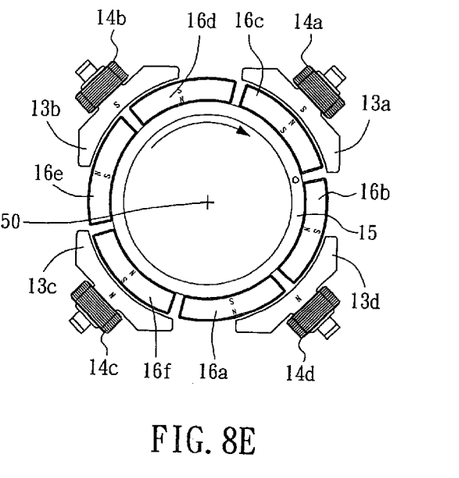

As shown in FIG. 8E, the lens seat 15 is moving from the fourth stage to a fifth stage (please refer to FIG. 7 for polarities of the yokes 13a, 13b, 13c and 13d corresponding to the fifth stage). When impulse currents whose directions are opposite to those for the fourth stage are applied to the respective driving coils 14b and 14d, the yoke 13b (S) and the yoke 13d (N) repel the permanent magnet 16d (S) and the permanent magnet 16a (N) respectively (i.e., repulsion of the same polarity) in a clockwise direction around the central axis 50. Meanwhile, the yoke 13a (S) and the yoke 13c (N) attract the permanent magnet 16c (N) and the permanent magnet 16f (S) respectively (i.e., attraction between opposite polarities), so that the lens seat 15 moves along the central axis 50 in the front direction 51 towards the fifth stage.

Figure 8F:
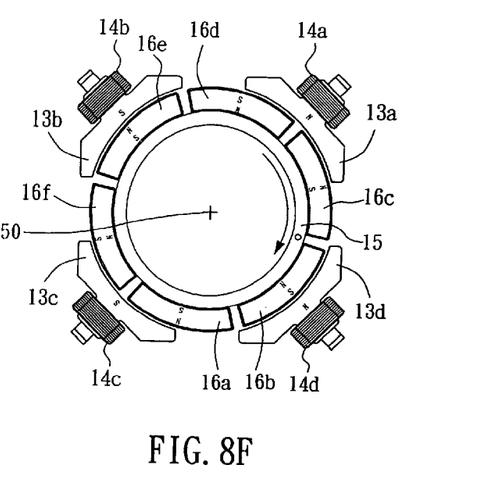

As shown in FIG. 8F, the lens seat 15 is moving from the fifth stage to a sixth stage (please refer to FIG. 7 for polarities of the yokes 13a, 13b, 13c and 13d corresponding to the sixth stage). When impulse currents whose directions are opposite to those for the fifth stage are applied to the respective driving coils 14a and 14c, the yoke 13a (N) and the yoke 13c (S) repel the permanent magnet 16c (N) and the permanent magnet 16f (S) respectively (i.e., repulsion of the same polarity) in a clockwise direction around the central axis 50. Meanwhile, the yoke 13b (S) and the yoke 13d (N) attract the permanent magnet 16e (N) and the permanent magnet 16b (S) respectively (i.e., attraction between opposite polarities), so that the lens seat 15 moves along the central axis 50 in the front direction 51 towards the sixth stage.

To sum up, the present invention provides a multi-stage lens driving device 10 for driving an optical lens 20 for the purpose of zooming and/or focusing, the multi-stage lens driving device defining a central axis 50 and comprising: a front cover 11, a rear cover 12, a plurality of yokes 13, a plurality of driving coils 14, a lens seat 15, and a plurality of permanent magnets 16. The front cover 11 is a hollow annular cover and includes an inner periphery 111, an outer periphery 112, a front surface 113 and a bottom surface 114.

The front cover 11 is a hollow annular cover having a plurality of recesses 115 formed on the inner periphery 111 and a plurality of holders 116 on the outer periphery 112. The rear cover 12 can be combined with the front cover 11, thereby forming a receiving space 118 therebetween. The lens seat 15 is a hollow housing disposed in the receiving space 118. The yokes 13 are located in the recesses 115 of the front cover 11. The permanent magnets 16 are surrounding and embedded in an outer periphery of the lens seat 15, disposed in correspondence to the yokes 13 and spaced therefrom by a predetermined distance. The permanent magnets 16 have top surfaces 161 of different polarities (N or S) facing the yokes 13. The permanent magnets 16 are arranged alternately with respect to the different polarities of the top surfaces 161.

The driving coils 14 are provided on the holders 116 of the front cover 11 respectively. When predetermined impulse currents of different directions are applied to the driving coils 14 respectively, polarities of the corresponding yokes 13 are thereby reversed. When the impulse current directions of the respective driving coils 14 are sequentially changed in a rotational order with respect to the central axis 50, the yokes 13 corresponding to the respective driving coils 14 reverse polarities alternately. The alternate magnetic attraction and repulsion between the permanent magnets 16 embedded in the lens seat 15 and the yokes 13 result in rotational translation of the lens seat 15 in the receiving space 118 due to alternate polarity reversal of the yokes 13, wherein the plurality of permanent magnets 16 provide for multi-stage focusing.

The present invention has been described with a preferred embodiment thereof and it is understood that various changes and modifications in the described embodiment can be carried out without departing from the scope and the spirit of the invention that is intended to be limited only by the appended claims.

What is claimed is:

1. A multi-stage lens driving device which defines a central axis, comprising:
    a front cover, which is a hollow annular cover having a plurality of recesses formed on an inner periphery thereof and a plurality of holders on an outer periphery thereof;
    a rear cover, which can be combined with the front cover, thereby forming a receiving space therebetween;
    a plurality of yokes, disposed respectively in the recesses formed on the inner periphery of the front cover;
    a plurality of driving coils, disposed respectively on the holders of the front cover and corresponding respectively to the yokes disposed in the recesses;
    a lens seat, which is a hollow housing disposed in the receiving space; and
    a plurality of permanent magnets, surrounding and embedded in an outer periphery of the lens seat, disposed in correspondence to the yokes and spaced therefrom by a predetermined distance;
    wherein, when predetermined impulse currents of different directions are applied to the driving coils respectively, polarities of corresponding yokes are thereby reversed; magnetic attraction and repulsion between the respective permanent magnets; and the yokes result in a rotational translation of the lens seat in the receiving space along the central axis; and when no impulse current is applied to the driving coils, the lens seat is held at a predetermined location by an attraction between the permanent magnets and the yokes, so that the lens seat does not wobble.

2. The multi-stage lens driving device as claimed in claim 1, wherein the rear cover is provided with an annular rail cooperating with a sliding groove pre-formed on the inner periphery of the front cover, so that a sliding block correspondingly arranged on a rear side of the lens seat is confined within the annular rail and the sliding groove for moving rotationally therein; and a ramp in the annular rail allows the lens seat to move linearly back and forth inside the receiving space along the central axis.

3. The multi-stage lens driving device as claimed in claim 1, wherein the permanent magnets provided on the lens seat is one of double-pole permanent magnets and single-pole permanent magnets.

4. The multi-stage lens driving device as claimed in claim 1, wherein, when the predetermined impulse currents of different impulse current directions are applied to the driving coils respectively and the impulse current directions in the respective driving coils are sequentially changed in a rotational order with respect to the central axis, the yokes corresponding to the respective driving coils reverse polarities alternately; and alternate magnetic attraction and repulsion between the permanent magnets embedded in the lens seat and the yokes result in multi-stage translation of the lens seat in the receiving space as the permanent magnets are driven by alternate polarity reversal of the yokes.

5. The multi-stage lens driving device as claimed in claim 1, wherein the permanent magnets have surfaces of different polarities (N or S) facing the yokes, and the permanent magnets are arranged alternately with respect to the different polarities of said surfaces.

6. The multi-stage lens driving device as claimed in claim 1, wherein the lens seat is equipped with at least one optical lens in a center thereof, and the at least one optical lens translates simultaneously with the lens seat.

7. The multi-stage lens driving device as claimed in claim 1, wherein the holders are in two pairs and evenly located on the outer periphery of the front cover in positional correspondence to the recesses in the inner periphery of the front cover, wherein holders of the same pair are located at opposite positions on the outer periphery of the front cover; and the driving coils are wound on the holders respectively, so that impulse currents of different directions can be inputted to the driving coils to reverse the polarities of the yokes.

8. The multi-stage lens driving device as claimed in claim 1, wherein the permanent magnets include six evenly distributed permanent magnets which are embedded in the outer periphery of the lens seat and capable of having magnetic attraction and repulsion with the corresponding yokes respectively, thereby driving the lens seat to translate back and forth in six stages along the central axis.

9. The multi-stage lens driving device as claimed in claim 1, wherein the polarities of the yokes resulted from the respective driving coils are reversed sequentially in a rotational order with respect to the central axis, and the rotational order is in a direction opposite to a direction in which the lens seat with the permanent magnets embedded therein rotates.

10. The multi-stage lens driving device as claimed in claim 2, wherein the annular rail is evenly divided into two ramps with a same slope steepness, a high slope and a low slope of one of the two ramps being connected with a low slope and a high slope of the other ramp respectively, so as to form an annular and wavy profiler; two corresponding sliding blocks arranged on the rear side of the lens seat can slide simultaneously on the two ramps, so that the lens seat translates linearly back and forth along the central axis in a stable manner.

11. A multi-stage lens driving device which defines a central axis, comprising:
a front cover, which is a hollow annular cover having a plurality of recesses and a sliding groove formed on an inner periphery thereof and a plurality of holders on an outer periphery thereof;
a rear cover, which can be combined with the front cover, thereby forming a receiving space therebetween, the rear cover being provided with an annular rail;
a plurality of yokes, disposed respectively in the recesses formed on the inner periphery of the front cover;
a plurality of driving coils, disposed respectively on the holders of the front cover and corresponding respectively to the yokes disposed in the recesses;
a lens seat, which is a hollow housing disposed in the receiving space and has a sliding block correspondingly arranged on a rear side of the lens seat, the sliding block being confined within the annular rail and the sliding groove for moving rotationally therein;
a plurality of permanent magnets, surrounding and embedded in an outer periphery of the lens seat, disposed in correspondence to the yokes and spaced therefrom by a predetermined distance; and
at least one optical lens, disposed in a center of the lens seat and translating simultaneously with the lens seat;
wherein, when predetermined impulse currents of different directions are applied to the driving coils respectively, polarities of corresponding yokes are thereby reversed, and magnetic attraction and repulsion between the respective permanent magnets and the yokes result in rotational translation of the lens seat in the receiving space along the central axis, thereby driving the optical lens to rotationally translate along the central axis by virtue of the sloped annular rail, the sliding groove and the sliding block, for the purpose of zooming or focusing.

12. The multi-stage lens driving device as claimed in claim 11, wherein, when the predetermined impulse currents of different impulse current directions are applied to the driving coils respectively and the impulse current directions in the respective driving coils are sequentially changed in a rotational order with respect to the central axis, the yokes corresponding to the respective driving coils reverse polarities alternately; and alternate magnetic attraction and repulsion between the permanent magnets embedded in the lens seat and the yokes result in multi-stage translation of the lens seat in the receiving space as the permanent magnets are driven by alternate polarity reversal of the yokes.

13. The multi-stage lens driving device as claimed in claim 11, wherein the permanent magnets have surfaces of different polarities (N or S) facing the yokes, and the permanent magnets are arranged alternately with respect to the different polarities of said surfaces.

14. The multi-stage lens driving device as claimed in claim 11, wherein the holders are in two pairs and evenly located on the outer periphery of the front cover in positional correspondence to the recesses in the inner periphery of the front cover, wherein holders of the same pair are located at opposite positions on the outer periphery of the front cover; and the driving coils are wound on the holders respectively, so that impulse currents of different directions can be inputted to the driving coils to reverse the polarities of the yokes.

15. The multi-stage lens driving device as claimed in claim 11, wherein the permanent magnets include six evenly distributed permanent magnets which are embedded in the outer periphery of the lens seat and capable of having magnetic attraction and repulsion with the corresponding yokes respectively, thereby driving the lens seat to translate back and forth in six stages along the central axis.

16. The multi-stage lens driving device as claimed in claim 11, wherein the annular rail is evenly divided into two ramps with a same slope steepness, a high slope and a low slope of one of the two ramps being connected with a low slope and a high slope of the other ramp respectively, so as to form an annular and wavy profiler; two corresponding sliding blocks arranged on the rear side of the lens seat can slide simultaneously on the two ramps, so that the lens seat translates linearly back and forth along the central axis in a stable manner.

17. The multi-stage lens driving device as claimed in claim 11, wherein the polarities of the yokes resulted from the respective driving coils are reversed sequentially in a rotational order with respect to the central axis, and the rotational order is in a direction opposite to a direction in which the lens seat with the permanent magnets embedded therein rotates.

18. A multi-stage lens driving device which defines a central axis, comprising:
- a housing, forming a receiving space therein;
- a lens seat, received in the receiving space in a manner that a rotational motion of the lens seat in the receiving space is allowed;
- an electromagnetic driving mechanism, comprising a plurality of driving coils and a plurality of permanent magnets, wherein one of the driving coils and the permanent magnets is combined with and annularly distributed on a periphery of the lens seat, and the other is combined with and annularly distributed on the housing, so that the lens seat rotates relative to the housing when predetermined impulse currents are applied to the driving coils;
- a guide mechanism arranged between the housing and the lens seat for converting rotation of the lens seat into linear translation along the central axis; and wherein:
- the housing comprises a front cover and a rear cover, in which the front cover is a hollow annular cover having a plurality of recesses formed on an inner periphery thereof and a plurality of holders on an outer periphery thereof; and the rear cover is combined with the front cover, thereby forming a receiving space therebetween;
- the electromagnetic driving mechanism further comprises a plurality of yokes disposed respectively in the recesses formed on the inner periphery of the front cover; in which the plurality of driving coils are disposed respectively on the holders of the front cover and corresponding respectively to the yokes disposed in the recesses, and the plurality of permanent magnets surround and are embedded in an outer periphery of the lens seat, disposed in correspondence to the yokes and spaced therefrom by a predetermined distance; and
- wherein, when the predetermined impulse currents of different directions are applied to the driving coils respectively, polarities of corresponding yokes are thereby reversed; magnetic attraction and repulsion between the respective permanent magnets; and the yokes result in rotational translation of the lens seat in the receiving space along the central axis; and when no impulse current is applied to the driving coils, the lens seat is held at a predetermined location by attraction between the permanent magnets and the yokes, so that the lens seat will not wobble.

19. The multi-stage lens driving device as claimed in claim 18, wherein the guide mechanism comprises an annular rail provided on the rear cover and a sliding block arranged on a rear side of the lens seat, in which the annular rail cooperate with a sliding groove pre-formed on the inner periphery of the front cover, so that the sliding block correspondingly arranged on the rear side of the lens seat is confined within the annular rail and the sliding groove for moving rotationally therein; and a ramp formed in the annular rail allows the lens seat to move linearly back and forth inside the receiving space along the central axis.

\* \* \* \* \*